(12) United States Patent
Steuernagel et al.

(10) Patent No.: US 9,932,030 B2
(45) Date of Patent: Apr. 3, 2018

(54) HYBRID DRIVE SYSTEM

(75) Inventors: Frank Steuernagel, Stuttgart (DE);
Peter Khatchikian, Schwieberdingen (DE); Sasha Dreschmann, Renningen/Malmsheim (DE); Boyke Richter, Karlsruhe (DE); Manfred Hellmann, Hardthof (DE); Rene Schenk, Heilbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1218 days.

(21) Appl. No.: 12/998,009

(22) PCT Filed: Aug. 13, 2009

(86) PCT No.: PCT/EP2009/060488
§ 371 (c)(1),
(2), (4) Date: May 23, 2011

(87) PCT Pub. No.: WO2010/028925
PCT Pub. Date: Mar. 18, 2010

(65) Prior Publication Data
US 2011/0219772 A1    Sep. 15, 2011

(30) Foreign Application Priority Data

Sep. 11, 2008  (DE) .......................... 10 2008 041 985

(51) Int. Cl.
*B60K 6/48*    (2007.10)
*B60K 6/52*    (2007.10)
(Continued)

(52) U.S. Cl.
CPC ............... *B60W 20/30* (2013.01); *B60K 6/48* (2013.01); *B60K 6/52* (2013.01); *B60K 6/54* (2013.01);
(Continued)

(58) Field of Classification Search
CPC .... B60K 6/48; B60K 6/52; B60K 6/54; B60L 11/14; B60L 15/2009; B60L 2240/12;
(Continued)

(56) References Cited

U.S. PATENT DOCUMENTS 3,352,373 A * 11/1967 Tuck ............................. 180/243
5,327,992 A *  7/1994 Boll ........................... 180/65.25
(Continued)

FOREIGN PATENT DOCUMENTS

CN    1167052    12/1997
CN    1810557     8/2006
(Continued)

OTHER PUBLICATIONS

English Machine Translation of DE 102006046419 A1 is U.S. Patent Publication 2009/0211824.*

*Primary Examiner* — Mark Laurenzi
*Assistant Examiner* — Paul Thiede
(74) *Attorney, Agent, or Firm* — Norton Rose Fulbright US LLP; Gerard Messina

(57) ABSTRACT

A hybrid drive system for a motor vehicle includes an internal combustion engine and at least one electric motor, each driving wheels of the motor vehicle. The internal combustion engine is coupled to the corresponding wheels via a first multispeed transmission. The electric motor is coupled to the corresponding wheels via a second multispeed transmission.

13 Claims, 2 Drawing Sheets

(51) Int. Cl.
　　　B60K 6/54　　　(2007.10)
　　　B60W 10/02　　(2006.01)
　　　B60W 10/06　　(2006.01)
　　　B60W 10/08　　(2006.01)
　　　B60W 10/11　　(2012.01)
　　　B60W 20/00　　(2016.01)
　　　B60W 30/19　　(2012.01)
　　　B60L 3/00　　　(2006.01)
　　　B60L 11/14　　(2006.01)
　　　B60L 15/20　　(2006.01)
　　　B60W 20/30　　(2016.01)
　　　B60W 30/184　(2012.01)
　　　B60L 7/26　　　(2006.01)

(52) U.S. Cl.
　　　CPC ............. *B60L 3/0061* (2013.01); *B60L 7/26* (2013.01); *B60L 11/14* (2013.01); *B60L 15/2009* (2013.01); *B60W 10/02* (2013.01); *B60W 10/06* (2013.01); *B60W 10/08* (2013.01); *B60W 10/11* (2013.01); *B60W 30/184* (2013.01); *B60W 30/19* (2013.01); *B60L 2240/12* (2013.01); *B60L 2240/421* (2013.01); *B60L 2240/423* (2013.01); *B60L 2240/425* (2013.01); *B60L 2240/441* (2013.01); *B60L 2240/461* (2013.01); *B60L 2240/486* (2013.01); *B60L 2260/26* (2013.01); *B60L 2270/145* (2013.01); *B60W 20/00* (2013.01); *B60W 2510/081* (2013.01); *B60W 2510/083* (2013.01); *Y02T 10/6221* (2013.01); *Y02T 10/6265* (2013.01); *Y02T 10/6286* (2013.01); *Y02T 10/645* (2013.01); *Y02T 10/70* (2013.01); *Y02T 10/7077* (2013.01); *Y02T 10/72* (2013.01); *Y02T 10/7275* (2013.01)

(58) Field of Classification Search
　　　CPC ......... B60L 2240/421; B60L 2240/423; B60L 2240/425; B60L 2240/441; B60L 2240/461; B60L 2240/486; B60L 2260/26; B60L 2270/145; B60L 3/0061; B60L 7/26; B60W 10/02; B60W 10/06; B60W 10/08; B60W 10/11; B60W 20/00; B60W 20/30; B60W 2510/081; B60W 2510/083; B60W 30/184; B60W 30/19; Y02T 10/6221; Y02T 10/6265; Y02T 10/6286; Y02T 10/645; Y02T 10/70; Y02T 10/7077; Y02T 10/72; Y02T 10/7275

USPC .......... 60/698, 706, 709, 710, 711, 716, 717, 60/718, 719; 180/65.22, 65.25
　　　See application file for complete search history.

(56) References Cited

U.S. PATENT DOCUMENTS

| | | | | |
|---|---|---|---|---|
| 6,595,308 | B2* | 7/2003 | Bowen | 180/65.6 |
| 6,751,960 | B2* | 6/2004 | Arimitsu et al. | 60/706 |
| 6,847,189 | B2* | 1/2005 | Frank | 320/104 |
| 7,017,348 | B2* | 3/2006 | Tajima et al. | 60/706 |
| 7,040,433 | B2* | 5/2006 | Yamamoto et al. | 180/65.225 |
| 7,240,748 | B2* | 7/2007 | Kira et al. | 180/65.25 |
| 2003/0203782 | A1 | 10/2003 | Casey et al. | |
| 2007/0204601 | A1 | 9/2007 | Ishii et al. | |
| 2008/0051248 | A1 | 2/2008 | Kozarekar et al. | |
| 2008/0305923 | A1* | 12/2008 | Tabata et al. | 477/3 |
| 2009/0152070 | A1* | 6/2009 | Nakamura et al. | 192/219 |

FOREIGN PATENT DOCUMENTS

| | | |
|---|---|---|
| CN | 1978239 | 6/2007 |
| DE | 196 23 847 | 12/1996 |
| DE | 199 39 813 | 2/2001 |
| DE | 10 2006 045 521 | 4/2008 |
| DE | 10 2006 046 419 | 5/2008 |
| EP | 0 224 144 | 6/1987 |
| EP | 0 941 883 | 9/1999 |
| EP | 1 036 957 | 9/2000 |
| EP | 1 249 601 | 10/2002 |
| EP | 1 577 138 | 9/2005 |

* cited by examiner

HYBRID DRIVE SYSTEM

CROSS REFERENCE TO RELATED APPLICATIONS

This application is a national stage of International Patent Application No. PCT/EP2009/060488 filed on Aug. 13, 2009, which claims priority to German Patent Application No. 102008041985.0 filed on Sep. 11, 2008, the contents of which are incorporated herein by reference.

BACKGROUND OF THE INVENTION

1. Field of the Invention

The present invention relates to a hybrid drive system for a motor vehicle having at least one internal combustion engine and at least one electric motor driving at least one wheel of the motor vehicle.

2. Description of Related Art

Against the background of rising crude oil prices and the looming change in the earth's climate, there is a constantly growing demand for the most fuel-efficient motor vehicles.

One promising approach is to use motor vehicles having hybrid drive systems. In hybrid drive systems, another motor using a different form of energy to drive the vehicle is used in addition to the normal internal combustion engine. Electric motors have become popular in practice for this purpose.

Due to the use of additional motors, it is possible on the one hand to operate the internal combustion engine mostly in a particularly energy-efficient mode. The driving power supplied by the internal combustion engine and not utilized to drive the motor vehicle at a given time may be stored temporarily in an energy storage such as a battery. The energy stored temporarily in this way may be used at a later time to drive the motor vehicle. This makes it possible to reduce the load on the internal combustion engine or turn it off completely. It is also possible to design the internal combustion engine to have smaller dimensions, if necessary. Furthermore, it is possible to convert the kinetic energy of the motor vehicle into electrical energy during deceleration of the vehicle and to store this electrical energy temporarily in the battery. The braking energy is thereby not "lost."

On the basis of these (and additional) effects, motor vehicles using hybrid drive systems are particularly fuel-efficient, in particular when the motor vehicle is operated in city traffic.

Since the technology is still relatively new, there are a great many as yet unsolved detail problems which have so far prevented widespread success of hybrid drive systems.

For example, so-called axle-split hybrid drives (the drive motors act on different drive axles) are problematic. In these systems, one axle of the vehicle is driven by a conventional internal combustion engine, while the electric motors of the hybrid drive act on a second axle. In such axle-split hybrid drives, the electric motor cannot cover the entire vehicle velocity range. On the one hand, the maximum possible speed of the electric motor is limited on the upside to prevent damage to the electric motor. However, if the electric motor is operated at low rotational speeds, this results in unfavorable efficiency of the electric motor, which is of course undesirable. Designing the operating point of the electric motor therefore represents a compromise which causes problems at both ends of the velocity range of the vehicle.

To be less restricted by the upper speed limit of the electric motor, published European patent document EP 0 224 144 A1 has already proposed allowing the mechanical connection between the drive axle and the electric motor to be achieved by a clutch. The efficiency of the electric motor in the low velocity range of the motor vehicle may be increased in this way. At the same time, damage to the electric motor at high vehicle velocities may be prevented by disengaging the clutch.

However, the hybrid drive systems known so far still have disadvantages.

BRIEF SUMMARY OF THE INVENTION

It is therefore proposed that a hybrid drive system for a motor vehicle having at least one internal combustion engine and at least one electric motor, each driving at least one wheel of the vehicle, the at least one internal combustion engine being coupled to the at least one corresponding wheel via a first multispeed transmission, being refined in such a way that the at least one electric motor is coupled to the at least one corresponding wheel via a second multispeed transmission. By using such a second multispeed transmission, it is possible to operate at least one electric motor essentially always at a favorable operating point (i.e., at higher rotational speeds) over the entire speed range of the motor vehicle. This makes it possible for the additional electric motor to supply a high additional driving power over the entire velocity range of the vehicle in a particularly effective manner. On the other hand, it is also possible in a recuperative mode to convert as much kinetic energy as possible into electrical energy and store it temporarily. The fuel used may thus be utilized particularly effectively. It is also possible for the axle driven by the internal combustion engine to be already driven by a hybrid drive (parallel hybrid or power splitter). The multispeed transmissions may be any desired transmissions in which the gear ratio may be varied. In particular these may be staged transmissions, continuously variable transmissions, automatic transmissions, manual transmissions and/or automated transmissions with speedshift. The multispeed transmissions (first multispeed transmission/second multispeed transmission, etc.) may of course also be designed to be different. They may be coupled to a single wheel or to a drive axle. Differentials or the like, for example, may also be provided.

It may prove to be particularly effective if the at least one internal combustion engine and the at least one electric motor are coupled to different wheels, preferably to wheels on different axles. A kind of all-wheel drive may be implemented in a particularly simple manner in this way. Furthermore, such a design also has advantages with regard to the triggering of the different motors.

It may be advantageous if at least one of the multispeed transmissions is designed as a multistage transmission. Such transmissions have been optimized over many decades and are therefore available in advantageous designs with no problem. Furthermore, the losses occurring in the transmission are relatively minor. The multistage transmissions may be automatic transmissions, manual transmissions or automated transmissions with speedshift in any desired manner.

It is possible to provide a control circuit which influences the shift position of at least one of the multispeed transmissions and/or the triggering of the at least one internal combustion engine and/or the triggering of the at least one electric motor. The influence may of course extend so far that the corresponding component(s) is (are) controlled essentially completely by the control circuit. With the aid of such a control circuit, different regulatory tasks may be assumed in a particularly simple manner. For example, the hybrid drive system may be optimized for particularly efficient and energy-saving driving, for the most comfortable possible driving or for a "middle position." In particular when it is a motor vehicle having manual shifting (completely manual transmission and/or automated transmission with speedshift) it is preferable if the control circuit influences or even essentially effectuates in particular the triggering of the electric motor and/or the triggering of the second multispeed transmission (which corresponds to the electric motor). Therefore a largely authentic driving performance of the motor vehicle may be imparted for the driver of the motor vehicle.

It is also possible to provide measuring sensors, which measure in particular the shift position of at least one of the multispeed transmissions and/or the operating state of the at least one internal combustion engine and/or the operating state of the at least one electric motor and/or the operating state of the motor vehicle and/or the position of operating elements of the motor vehicle. With knowledge of corresponding parameters, it is possible to allow the triggering of the other components and/or parts thereof to be accomplished in a particularly effective manner. A shift position of at least one of the multispeed transmissions is to be understood in particular as the particular gear selected and/or the clutch setting "engaged" or "disengaged." An operating state of an engine/motor (internal combustion engine/electric motor) is to be understood to refer in particular to the power demand, the power release, the rotational speed and the temperature of the corresponding engine/motor. The operating state of the motor vehicle is to be understood in particular as referring to the velocity of the motor vehicle, the steering wheel positions, the roadway condition, the temperature of the cooling water, the outside temperature as well as uphill and downhill driving. The setting of operating elements of the motor vehicle is understood to refer not only to the position of the accelerator pedal, the brake pedal and the clutch pedal but instead may also include a manual speedshift or a certain shifting strategy selected by the driver. For example, the driver may be enabled to select between a rather sporty shifting strategy, a most fuel-efficient shifting strategy, and a most comfortable shifting strategy.

It may prove reasonable to store at least one characteristic curve, preferably at least one characteristic field having a plurality of characteristic curves in the control circuit. With the aid of characteristic curves or characteristic fields, conditions may be defined under which a shifting operation should take place in a second multispeed transmission (belonging to an electric motor), for example. It is possible, for example, to define a shifting condition as a function of a wheel rotational speed and of the torque of the electric motor (or also as a function of the torque requested by the driver of the motor vehicle). It is possible here to select the shifting condition for upshifting the multispeed transmission to be different from the shifting condition for downshifting the multispeed transmission. It is also possible to store a plurality of characteristic fields. Each characteristic field may stand for a certain shifting strategy. For example, a first characteristic field may minimize fuel consumption, a second characteristic field may optimize driving comfort and a third characteristic field may set a sporty driving performance. In this way the hybrid drive system may be adapted to an individual driver's intent in a particularly simple manner.

It may be advantageous if a gear change of a multispeed transmission, in particular a second multispeed transmission, is implemented on reaching limiting stress conditions in the hybrid drive system to avoid overloading parts of the hybrid drive system. For example, if mechanical and/or electrical load limits of the electric motor are reached, a gear change is initiated in any case. In this case, the operational reliability of the hybrid drive system has priority over driving comfort and/or economy. The load limit need not necessarily represent a destruction limit of a device but instead may also be a limit at which there is a sharp increase in wear, for example. One example of this is that upshifting of the second multispeed transmission is triggered when the rotational speed of the electric motor approaches a critical level.

It may prove reasonable if a gear change of a second multispeed transmission (belonging to an electric motor) preferably occurs with a gear change of a first multispeed transmission (belonging to an internal combustion engine). This strategy may be reasonable in particular if the first multispeed transmission is a manual transmission. The interruption in the tractive power of the electric motor occurs here at a time when the driver is expecting an interruption in tractive power anyway, so there is no subjective loss of comfort for the driver of the motor vehicle. On the contrary, an authentic driving perception may be created in this way.

In the case of a gear change in a second multispeed transmission (belonging to an electric motor) it is also possible to compensate for the loss of tractive power at least partially, preferably essentially by at least one other motor, in particular at least one internal combustion engine. This may be implemented, for example, by the fact that a control circuit upregulates the power required of the internal combustion engine according to the loss of tractive power of the electric motor. The loss of comfort may therefore be reduced or essentially suppressed by the "jerky shifting" of the second multispeed transmission. The hybrid drive system is able to meet particularly high comfort demands in this way. It is possible in particular for the internal combustion engine to at least partially compensate for the loss of tractive power due to the stoppage of the electric motor during the shifting operation of the second multispeed transmission. However, even if the internal combustion engine is not (completely) reregulated during such a "jerky shifting," there nevertheless remains a certain tractive power (namely the tractive power of the internal combustion engine, elevated, if necessary) so that the jerky shifting may be (subjectively lower) for the occupants of the vehicle.

It is also reasonable if the gear of the second multispeed transmission is changed in a torque range of the electric motor in which the loss of tractive power may be compensated largely, preferably essentially completely, by at least one other motor/engine, in particular at least one of the internal combustion engines. The term "largely" here is understood to refer to a tractive power compensation of, for example, 85%, 90%, 95%, 98%, 99% or 100%. If the operating conditions cause a "threat" of leaving such a torque range, then a shifting operation of the second multispeed transmission is initiated in advance, for example. In this way it is possible to implement the most extensive possible compensation of tractive power for most of the operating states of the hybrid drive system.

It is also possible that with at least one running internal combustion engine, a gear change of a second multispeed transmission takes place at the lowest possible torques of the electric motor, the efficiency of the electric motor and/or the power hyperbola of at least one electric motor functions as the lower limit. Low torques of the electric motor usually have the advantage that the noticeable jerky shifting is particularly low or only particularly low interruptions in tractive power must be compensated by the internal combustion engine. A lower limit for an upshifting operation is reasonably defined by the efficiency curve of the electric motor. If the efficiency of the electric motor drops, then the profitability aspect is predominant over the comfort aspect beyond a certain point. Another lower limit may result from the power hyperbola of the electric motor. Above the power hyperbola, the product of the rotational speed and the torque is constant. However, at lower rotational speed, the maximum torque is constant and independent of the rotational speed. The shifting operation here may sensibly be performed in such a way that a maximum torque of the electric motor may be obtained after the upshifting operation. It is also possible for the lower limit to depend on other parameters, for example, the rotational speed of the electric motor, the required torque of the electric motor and/or whether the multistage transmission of the internal combustion engine is shifted. For example, when the internal combustion engine is engaged using the clutch, the shift limit may be defined via the efficiency, whereas in the case of a gear change of the internal combustion engine, the shift operation of the second multispeed transmission is defined by the power hyperbola, which usually causes a shifting operation at lower rotational speeds and/or lower torques. It is also possible to perform the weightings (or a portion thereof) as a function of a driver's intent.

Another preferred embodiment of the hybrid drive system may be obtained when a gear change of a second multispeed transmission occurs at the lowest possible torques of the electric motor, while at least one internal combustion engine is shut off. The noticeable jerky shifting here is less, the lower the torque of the electric motor is. The curve may also be selected in such a way that initially there is no shifting at all at higher torques and, for example, there is initially a wait until at least one internal combustion engine has been started. However, a lower limit may also be predefined here using the power hyperbola or the efficiency curve of the electric motor, for example, and a correction factor may, if necessary, also be used here (in particular in relation to the shifting condition while the internal combustion engine is running).

In addition, it is possible that downshifting of a second multispeed transmission (belonging to an electric motor) is delayed and/or prevented during deceleration of the motor vehicle and/or in a recuperative mode, in particular in a high torque range of the electric motor, specifically when at least one internal combustion engine is shut off. In particular in idling operation of the internal combustion engine or when the internal combustion engine is shut off, it is difficult or virtually impossible to compensate for the interruption in the deceleration power of the electric motor due to the "jerky shifting" with the aid of the internal combustion engine. If downshifting of the second multispeed transmission is delayed or even prevented here, then less braking energy is recovered by conversion to electrical energy but driving comfort may be greatly increased. The gain in driving comfort more than makes up for the comparatively minor disadvantage of a relatively minor power loss. The greater the jerky shifting (not compensated) of the second multispeed transmission naturally turns out to be, the higher the torque of the electric motor is.

Another preferred specific embodiment of the hybrid drive system may be obtained when the internal combustion engine is started before a shifting operation of a second multispeed transmission when the internal combustion engine is shut off and/or shut-off of the internal combustion engine when it is running is delayed until a shifting operation of a second multispeed transmission is performed. Therefore it is possible in a particularly elegant manner to reduce or prevent unwanted jerky shifting, which might be caused by shifting of the second multispeed transmission.

In addition, it is proposed that a motor vehicle be provided with a hybrid drive system having the properties described above. The motor vehicle then has the properties and advantages already described in a similar manner.

In addition, a method in which the hybrid drive system of a motor vehicle as described above is shifted in the manner described above is also claimed.

DETAILED DESCRIPTION OF THE INVENTION

Figure 1:
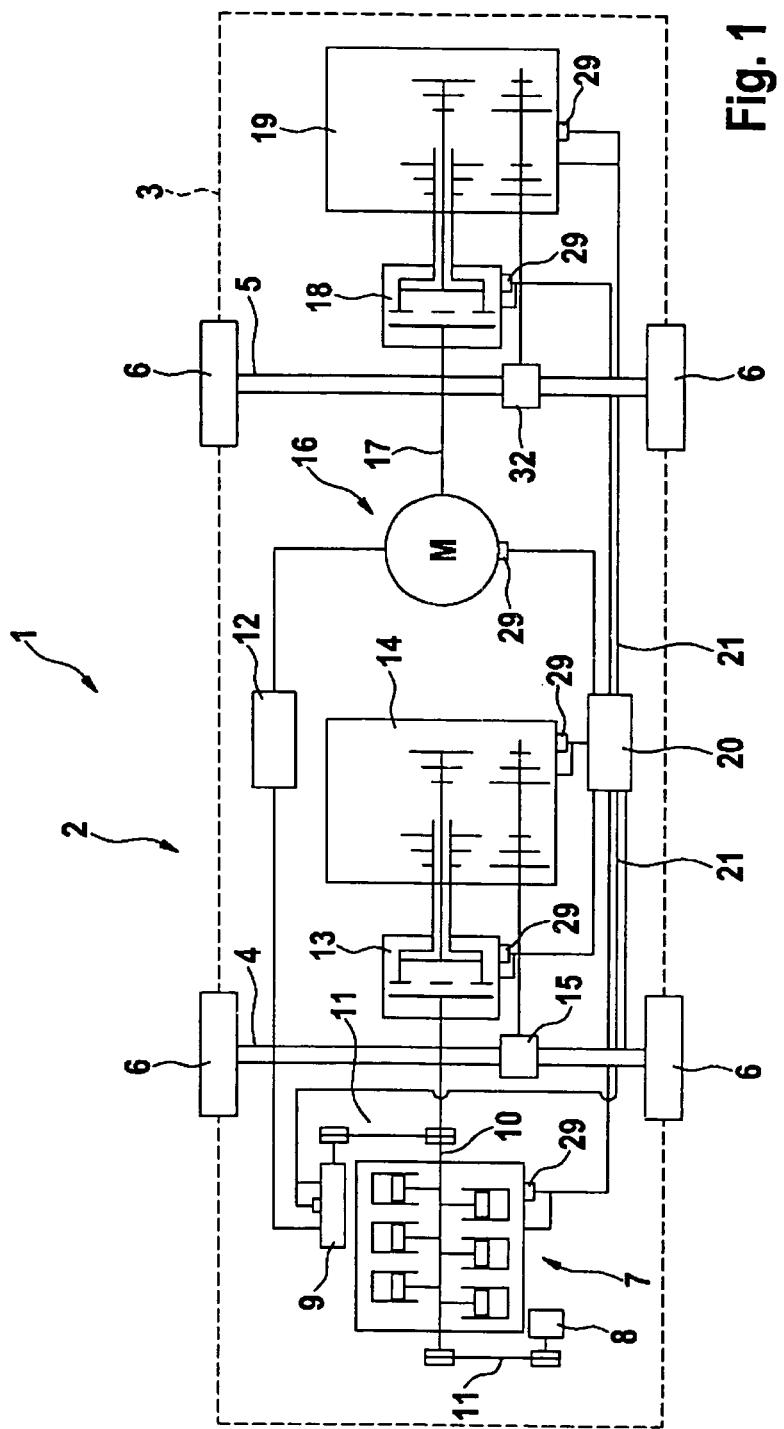
FIG. 1 shows an exemplary embodiment of a hybrid drive system in a schematic top view.

FIG. 1 shows a motor vehicle 1 having a hybrid drive system 2 in a schematic top view. Chassis 3 of motor vehicle 1 is only shown schematically for the sake of simplicity. Hybrid drive system 2 of motor vehicle 1 has two axles 4, 5 having wheels 6 mounted on each axle. Front axle 4 is driven by an internal combustion engine 7.

Internal combustion engine 7 has the usual secondary units, which are only partially shown in FIG. 1 for graphic reasons. FIG. 1 shows starter 8 and a generator 9. Starter 8 and generator 9 are connected to drive shaft 10 of internal combustion engine 7 via V-belts 11, for example. In operating states of motor vehicle 1 in which the power generated by internal combustion engine 7 is not needed completely to drive motor vehicle 1, electrical energy is generated with the aid of generator 9 and may be stored temporarily in a battery 12.

The tractive power generated by internal combustion engine 7 is conveyed to wheels 6 mounted on front axle 4 via drive shaft 10, a clutch 13, a mechanical manual transmission 14 and a differential 15. Clutch 13 and manual transmission 14 are embodied as mechanical, manually operated modules in the present case.

If the rotational speed of internal combustion engine 7 increases with an increase in the velocity of vehicle 1, the driver of the motor vehicle will disengage clutch 13 at a certain point in time and will shift manual transmission 14 to the next higher gear. The driver will then engage clutch 13 again by releasing the clutch pedal. During deceleration of motor vehicle 1, the driver of the motor vehicle will downshift the gear of transmission 14 accordingly.

In addition to internal combustion engine 7, hybrid drive 2 of motor vehicle 1 has an electric motor 16. Electric motor 16 drives wheels 6 on rear axle 5 via a drive shaft 17, a second clutch 18, a second transmission 19 and a second differential 32. Second clutch 18 and second transmission 19 are each actuated automatically by an electronic control circuit 20. Electric motor 16 is also triggered by electronic control circuit 20. Electric motor 16 derives electrical energy from battery 12 in a drive mode. In a recuperative mode, electric motor 16 functions as a generator, and the electrical energy generated by it is stored temporarily in battery 12. Control circuit 20, in addition to influencing electric motor 16, second clutch 18 and second transmission 19, may also be capable of influencing the driving power of internal combustion engine 7.

Electronic control circuit 20 is connected to a plurality of measuring sensors 29 via signal lines 21, these measuring sensors being situated in first manual transmission 14, in first clutch 13, in internal combustion engine 7 and/or in generator 9, for example. Additional measuring sensors 29 may also be provided in electric motor 16 itself, for example, where they may measure the rotational speed of electric motor 16, for example. In addition, a measuring sensor 29 able to measure the rotational speed of wheels 6 and able to supply the measuring signal to control circuit 20 via a control line 21 is also provided.

The operating point of electric motor 16 may be adapted as a function of the rotational speed of wheels 6 and thus also as a function of the vehicle velocity due to the fact that the driving energy released by electric motor 16 (or the mechanical deceleration energy in a recuperative mode of motor vehicle 1) is supplied to wheels 6 mounted on rear axle 5 via a second clutch 18 and a second transmission 19. At a low velocity of motor vehicle 1, electronic control circuit 20 selects a low gear for second transmission 19, for example. Electric motor 16 therefore has an increased rotational speed, which results in a high efficiency of electric motor 16. At a high velocity of motor vehicle 1, however, electronic control 20 selects a high gear for second transmission 19. This prevents overrevving of electric motor 16, which could damage electric motor 16.

Figure 2:
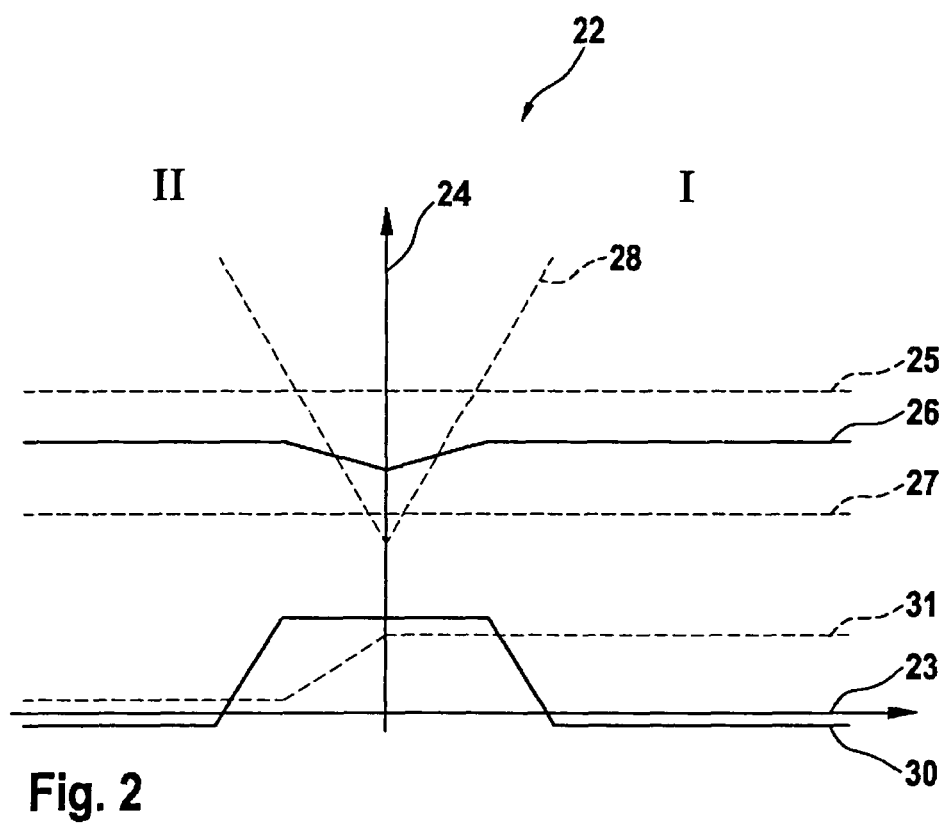
FIG. 2 shows an exemplary embodiment of a characteristic field.

FIG. 2 shows a shifting diagram 22 suitable for operation of motor vehicle 1 which is provided with a hybrid drive system 2, as illustrated in FIG. 1. The torque of electric motor 16 is plotted on abscissa 23. The torque of electric motor 16 may be positive (right side I of shifting diagram 22). This corresponds to a drive mode of motor vehicle 1 in which electric motor 16 drives motor vehicle 1. However, electric motor 16 may also be operated at a negative torque (left side II of shifting diagram 22). This corresponds to a recuperative mode in which vehicle 1 is decelerated.

The rotational speed of wheels 6 is plotted on ordinate 24 of shifting diagram 22. Under the usual operating conditions, this corresponds to the velocity of motor vehicle 1.

A first shifting condition is obtained from maximum rotational speed curve 25. When this rotational speed is reached, upshifting of second transmission 19 is always triggered immediately, regardless of the other operating conditions. This prevents the possibility of damage to electric motor 16. In the case of maximum rotational speed curve 25, the operational reliability of hybrid drive 2 dominates the comfort aspect and the economic aspect. This curve 25 is usually provided only as a safety measure because upshifting of second transmission 19 would usually occur sooner based on a different shifting curve.

A second shifting condition occurs in the form of the upshifting curve when internal combustion engine 26 is active. If internal combustion engine 7 is running and the operating point of electric motor 16 is above the upshifting curve with internal combustion engine 26 running, then second transmission 19 is shifted up by one gear. The curve should be at the lowest possible torque under comfort considerations (lowest possible jerky shifting or lowest possible compensation of jerky shifting by internal combustion engine 7). The upshifting curve when internal combustion engine 26 is active is therefore lower at low electric motor torques than at higher electric motor torques. However, at higher electric motor torques, upshifting is performed with a delay because of the high load redistribution then required between electric motor 16 and internal combustion engine 7 in order to "hope" for a gear change in the internal combustion engine (see next paragraph). Nevertheless the gear shift of second transmission 19 may also be performed unobtrusively in this range. In any case the gear shift occurs at a distance from maximum rotational speed curve 25. Shifting condition curve 26 naturally also takes into account the efficiency of electric motor 16 in the corresponding torque range or rotational speed range.

Another curve is in the form of the upshifting curve with internal combustion engine running and with internal combustion engine shift change 27. This curve 27 is selected only when, on the one hand, internal combustion engine 7 is in operation and, on the other hand, first clutch 13 (belonging to internal combustion engine 7) is disengaged. If the operating point of electric motor 16 is above the upshifting curve when internal combustion engine is running and with internal combustion engine shift change 27, then second transmission 19 of electric motor 16 is also upshifted by one gear. In the present shifting model 22, the upshifting curve when the internal combustion engine is active and with internal combustion engine shift change 27 is lower than the upshifting curve when internal combustion engine 26 is active (no internal combustion engine shift change). The upshifting curve when internal combustion engine 26 is active is limited on the down side essentially when the maximum possible torque of electric motor 16 would be limited (too much) by a higher gear. This depends on the position of the power hyperbola of electric motor 16. If the gear is too high it would go beyond the power hyperbola of electric motor 16, i.e., this would be in the range in which the product of rotational speed and torque is constant. If the rotational speeds are too low, the maximum torque of electric motor 16 is independent of rotational speed.

The upshifting curve with the internal combustion engine running and with internal combustion engine shift change 27 is essentially lower than the upshifting curve with internal combustion engine 26 running. In the case of a disengaged first clutch 13, the gear change of second transmission 19 thus necessarily takes place sooner than it would under economic aspects. However, this early gear shift is advisable because the driver of the motor vehicle expects an interruption in tractive power anyway when disengaging first clutch 13. This early upshifting results in a subject gain in comfort.

When internal combustion engine 7 is deactivated, the upshifting curve for internal combustion engine 28, which is off, is relevant. If the operating point of electric motor 16 is above the upshifting curve with internal combustion engine 28 off and if internal combustion engine 7 is shut off, then second transmission 19 is shifted up by one gear. Therefore, at low torques of electric motor 16, shifting is performed early, but at high torques it is performed much later. This shifting condition may additionally be combined with a certain time lag to thereby allow time for internal combustion engine 7 to first start before second transmission 19 is shifted, and thus one of the two upshifting curves acts as relevant when internal combustion engine 26, 27 is on. Upshifting of second transmission 19 with internal combustion engine 7 off should normally be triggered only at a low torque of electric motor 16. At a high torque of electric motor 16, it is more reasonable for internal combustion engine 7 to first be changed to the active state and for the shifting operation then to be triggered via the upshifting curve while internal combustion engine 26 is running. The shape of the upshifting curve for internal combustion engine 28, which is off, may also be selected in practice in such a way that shifting is performed at an early point in time in a low torque range; but at somewhat higher torques, shifting is not performed at all or is only performed very late (curve in the form of a very narrow "V").

During deceleration of motor vehicle 1, it is also possible in principle to operate in a higher gear of second transmission 19 (for example, in second gear) until motor vehicle 1 comes to a standstill. However, the efficiency of hybrid drive 2 (and any reacceleration of motor vehicle 1 that might become necessary) is then limited.

For this reason, it is more reasonable to trigger a downshifting of second transmission 19 during a deceleration of motor vehicle 1. To further increase the gain in comfort, it is possible to differentiate here between a downshifting curve while internal combustion engine 31 is running and a downshifting curve while internal combustion engine 30 is off.

While the internal combustion engine is running, downshifting of second transmission 19 is triggered when the operating point of electric motor 16 is below the downshifting curve while internal combustion engine 31 is running. At a positive torque of electric motor 16, internal combustion engine 7 may take over this torque during the shifting operation of second transmission 19. However, at a negative torque of electric motor 16 (recuperative mode), this torque cannot be compensated by internal combustion engine 7 and therefore there is a wait in downshifting to velocity 0. For this reason, the downshifting curve with internal combustion engine 31 running is also asymmetrical to ordinate 24. The driver's intent may also be taken into account as an additional criterion for the shifting condition in the downshifting curve when internal combustion engine 31 is running. In this way, the driver is able to suppress the downshifting for torques M of electric motor 16, where M≤0, by operating a suitable button, for example. Downshifting of second transmission 19 is then suppressed only if internal combustion engine 7 cannot in fact supply the desired torque.

While the internal combustion engine is off, the downshifting curve is relevant when internal combustion engine 30 is shut off. If the operating point of electric motor 16 is below the downshifting curve when internal combustion engine 30 is off, then downshifting is performed in a recuperative mode only at a standstill of the motor vehicle. However, shifting may be performed with no problem when the motor vehicle is at a standstill. If internal combustion engine 7 has received a disconnect signal, then it is also possible to provide through control 20 that initially there is a downshifting (advanced, if necessary) of second transmission 19 and only then is internal combustion engine 7 shut off. Turning off internal combustion engine 7 is thus delayed.

The missing braking torque may be applied by electric motor 16 with no problem through the conventional vehicle brakes due to a "wrong" gear in the case of the downshifting curve when internal combustion engine 31 is running as well as in the case of the downshifting curve when internal combustion engine 30 is off.

For the sake of simplicity, FIG. 2 shows only one shifting diagram 22 for a second transmission 19, which has only two gears. However, an expansion to a second transmission 19 having three or even more gears is readily possible.

What is claimed is:

1. A hybrid drive system for a motor vehicle, comprising:
    at least one internal combustion engine configured to drive at least one wheel of the vehicle;
    at least one electric motor configured to drive at least one wheel of the motor vehicle;
    a first multispeed transmission configured to couple the at least one internal combustion engine to the at least one wheel to be driven by the at least one internal combustion engine; and
    a second multispeed transmission configured to couple the at least one electric motor to the at least one wheel to be driven by the at least one electric motor,
    wherein the at least one internal combustion engine and the at least one electric motor are coupled to the at least one wheel on different axles,
    wherein at least one of the first and second multispeed transmissions is configured as a multistage transmission,
    wherein at least one of:
        (i) when the internal combustion engine is at a standstill, the internal combustion engine is started before a shifting operation of the second multispeed transmission; and
        (ii) when the internal combustion engine is running, shut-off of the internal combustion engine is delayed until a shifting operation of the second multispeed transmission is performed.

2. The hybrid drive system as recited in claim 1, further comprising:
    a control circuit configured to influence at least one of:
        (i) a shift position of at least one of the first and second multispeed transmissions;
        (ii) a triggering of the at least one internal combustion engine; and
        (iii) a triggering of the at least one electric motor.

3. The hybrid drive system as recited in claim 2, further comprising:
    measuring sensors configured to measure at least one of:
        (i) the shift position of at least one of the first and second multispeed transmissions;
        (ii) an operating state of the at least one internal combustion engine;
        (iii) an operating state of the at least one electric motor;
        (iv) an operating state of the motor vehicle; and
        (v) a setting of operating elements of the motor vehicle.

4. The hybrid drive system as recited in claim 2, wherein at least one characteristic curve is stored in the control circuit.

5. The hybrid drive system as recited in claim 4, wherein the at least one characteristic curve includes a plurality of characteristic curves which define shifting conditions of the motor vehicle.

6. The hybrid drive system as recited in claim 5, wherein the shifting conditions are selectable by a driver of the motor vehicle.

7. The hybrid drive system as recited claim 2, wherein the control circuit is configured to control a gear change of at least one of the first and second multispeed transmissions upon reaching a predetermined limiting stress condition in order to prevent overloading of parts of the hybrid drive system.

8. The hybrid drive system as recited in claim 2, wherein the control circuit is configured to control a gear change of the second multispeed transmission during a gear change of the first multispeed transmission.

9. The hybrid drive system as recited in claim 2, wherein a loss of tractive power during a gear change of the second multispeed transmission is compensated at least partially by the internal combustion engine.

10. The hybrid drive system as recited in claim 9, wherein the gear change of the second multispeed transmission is performed at a lowest possible torque of the electric motor above a lower limit when the internal combustion engine is running, and wherein at least one of the efficiency of the electric motor and the power hyperbola of the electric motor functions as the lower limit.

11. The hybrid drive system as recited in claim 9, wherein the gear change of the second multispeed transmission is performed at a lowest possible torque of the electric motor above a lower limit when the internal combustion engine is at standstill.

12. The hybrid drive system as recited in claim 9, wherein the gear change of the second multispeed transmission is performed in a torque range of the electric motor in which the loss of tractive power is substantially compensated by the internal combustion engine.

13. The hybrid drive system as recited in claim 2, wherein downshifting of the second multispeed transmission is at least one of delayed and prevented during at least one of a deceleration of the motor vehicle and a recuperative mode of the electric motor when the internal combustion engine is at standstill.

* * * * *